(12) United States Patent
Lee

(10) Patent No.: US 7,609,940 B2
(45) Date of Patent: Oct. 27, 2009

(54) DISPLAY DEVICE AND METHOD FOR RECORDING AND REPLAYING BROADCASTING PROGRAM THEREIN

(75) Inventor: Jae Kyung Lee, Daegu (KR)

(73) Assignee: LG Electronics Inc., Seoul (KR)

( * ) Notice: Subject to any disclaimer, the term of this patent is extended or adjusted under 35 U.S.C. 154(b) by 727 days.

(21) Appl. No.: 11/104,437

(22) Filed: Apr. 13, 2005

(65) Prior Publication Data

US 2005/0265695 A1    Dec. 1, 2005

(30) Foreign Application Priority Data

May 31, 2004    (KR)    .............. 10-2004-0039247

(51) Int. Cl.
*H04N 5/91* (2006.01)
*H04N 1/04* (2006.01)
*H04N 5/00* (2006.01)
*H04N 5/445* (2006.01)
*H04N 7/00* (2006.01)

(52) U.S. Cl. .................... 386/83; 386/46; 386/95; 386/125; 348/564; 358/474; 725/48; 725/55; 725/56; 725/61

(58) Field of Classification Search ............. 386/83, 386/46, 95, 125, E5.001, E5.024, E5.043; 358/474; 725/48, 55, 56, 61; 348/564, E5.105, 348/E7.071; 375/E7.005, E7.006, E7.024
See application file for complete search history.

(56) References Cited

U.S. PATENT DOCUMENTS

| 5,963,702 | A  | * | 10/1999 | Yamashita ............. 386/46 |
|---|---|---|---|---|
| 6,757,482 | B1 | * | 6/2004 | Ochiai et al. ............. 386/83 |
| 2002/0124256 | A1 | * | 9/2002 | Suzuka ............. 725/55 |
| 2002/0186423 | A1 | * | 12/2002 | Okajima et al. ............. 358/474 |
| 2003/0167468 | A1 | * | 9/2003 | Hermann et al. ............. 725/61 |
| 2004/0001690 | A1 | * | 1/2004 | Boston et al. ............. 386/46 |

* cited by examiner

*Primary Examiner*—Thai Tran
*Assistant Examiner*—Syed Y Hasan
(74) *Attorney, Agent, or Firm*—Birch, Stewart, Kolasch & Birch, LLP

(57) ABSTRACT

A method for selectively recording or replaying partial scenes of a broadcasting program includes the steps of: receiving a broadcasting program and a corresponding supplementary information; determining whether or not information on pre-selected scenes or user-selected scenes of the broadcasting program is contained in the supplementary information; and if so recording the pre-selected or user-selected scenes of the broadcasting program.

23 Claims, 6 Drawing Sheets

FIG. 3

| program | recording time (H/M/S) | size (byte) | recording status (%) |
|---|---|---|---|
| Growing up like Tim | 00 : 30 : 24 | 100MB | partial recording (35%) |
| Crimes in time | 01 : 15 : 25 | 500MB | normal recording (100%) |
| Another deal | 00 : 40 : 00 | 120MB | partial recording (40%) |
| ... | ... | ... | ... | recording history

FIG. 5

| programs | recording option |
|---|---|
| Growing up like Tim | normal replay/partial replay |
| Crimes in time | normal replay |
| Another deal | normal replay/partial replay |
| ⋮ | ⋮ | recording history

DISPLAY DEVICE AND METHOD FOR RECORDING AND REPLAYING BROADCASTING PROGRAM THEREIN This application claims the benefit of the Korean Application No. P 2004-39247 filed on May 31, 2004, which is hereby incorporated by reference.

BACKGROUND OF THE INVENTION

1. Field of the Invention

The present invention relates to a system for recording all or part(s) of a broadcasting program. More particularly, the present invention relates to a system and a method for recording and replaying partial scenes of a broadcasting program.

2. Discussion of the Related Art

Generally, a display device is a device giving a visual representation of a broadcasting signal to a viewer. That is, the display device receives the broadcasting signal, processes the received broadcasting signal based on a predetermined method, and displays the processed signals. The display device provides not only video and audio, but also a variety of information to the viewer. Recently, demand for a digital display device has been increasing according to development of multimedia technology.

A digital television includes various functions. Specifically, the digital television can store a video and audio signal in a personal video recorder (PVR) in real time and replay the stored video and audio signal at a desired time. While a VCR stores a video and audio signal on a magnetic tape, a PVR stores digital video and audio data. The PVR converts an incoming broadcasting signal into a digital signal, stores the digital signal in a memory, and displays the stored digital signal on a screen at a desired time. The PVR has various functions, including a preprogrammed recording and a time shift. A hard disk drive (HDD) is used as a storage unit. A 40 GB HDD can store two to three hours of broadcasting data.

However, although the conventional digital television can record an entire broadcasting program, it cannot partially record the broadcasting program, that is, it cannot selectively record important scenes of the broadcasting program.

SUMMARY OF THE INVENTION

Accordingly, the present invention is directed to a system and a method for recording and replaying a broadcasting program on a display device that substantially obviates one or more problems due to limitations and disadvantages of the related art.

An object of the present invention is to provide a display device and a recording method therein, which is capable of selectively recording key scenes, where such key scenes may be selected by a producer, broadcaster, or even an end user.

Another object of the present invention is to provide a display device and a replaying method therein, which is capable of selectively replaying key scenes.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for recording a broadcasting program, including the steps of: receiving a broadcasting program and corresponding supplementary information; determining whether or not information on pre-selected scenes of the broadcasting program is contained in the supplementary information; if the information on the pre-selected scenes is contained in the supplementary information, detecting the information on the pre-selected scenes from the supplementary information; and recording the pre-selected scenes of the broadcasting program based on the information on the pre-selected scenes.

The information on the pre-selected scenes includes an indicator that indicates a video signal period or duration corresponding to the pre-selected scenes, or includes a symbol or text, which represents the pre-selected scenes, such as by signaling a start point at the beginning of a pre-selected scene and an end point after the pre-selected scene.

The step of recording the pre-selected scenes of the broadcasting program includes the steps of: storing video data and audio data corresponding to the pre-selected scenes; and updating a recording history stored in a storage unit. The recording history includes at least one of a title, a summary, a recording time and/or date, a bit size or time duration of the recorded broadcasting program, and a ratio of a viewing duration of the pre-selected scenes to a viewing duration of the entirety of the broadcasting program.

Also, the present invention provides a method for replaying a broadcasting program, including the steps of: storing a broadcasting program having pre-selected scenes and corresponding supplementary information in a storage unit; detecting information on the pre-selected scenes from the stored supplementary information; and selectively displaying the pre-selected scenes of the stored broadcasting program based on the information on the pre-selected scenes.

The step of storing the broadcasting program and the supplementary information includes the step of adding information notifying that the information on the pre-selected scenes is contained in the supplementary information to a recording history stored in the storage unit.

In addition, the present invention provides a device, including: a controller for detecting information on pre-selected scenes of a received broadcasting program from supplementary information of the received broadcasting program, and recording the pre-selected scenes of the broadcasting program based on the detected information; and a storage unit for storing the pre-selected scenes of the broadcasting program and a recording history.

Further, the present invention provides a device, including: a storage unit for storing a broadcasting program having pre-selected scenes and corresponding supplementary information; a controller for detecting information on the pre-selected scenes from the stored supplementary information, and selectively displaying the pre-selected scenes of the stored broadcasting program based on the detected information.

Furthermore, the present invention provides a system, including: a transmitter for transmitting a broadcasting program having pre-selected scenes and corresponding supplementary information; and a display device for detecting information on the pre-selected scenes of the broadcasting program from the supplementary information, and selectively recording the pre-selected scenes of the broadcasting program based on the detected information.

The pre-selected scenes can be preview scenes or outline scenes that represent a plot of the broadcasting program. Alternatively, the scenes may be selected by the user to represent the plot of the broadcasting program, or the user-selected scenes could simply be the user's favorite scenes due to actors/actresses acting in the scenes, action, special effects, topics of the scenes, or any other criteria important to the user.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a diagram illustrating an example of a recording history;

FIG. 5 is a diagram illustrating another example of a recording history; and

DETAILED DESCRIPTION OF THE INVENTION

Reference will now be made in detail to the preferred embodiments of the present invention, examples of which are illustrated in the accompanying drawings.

Figure 1:
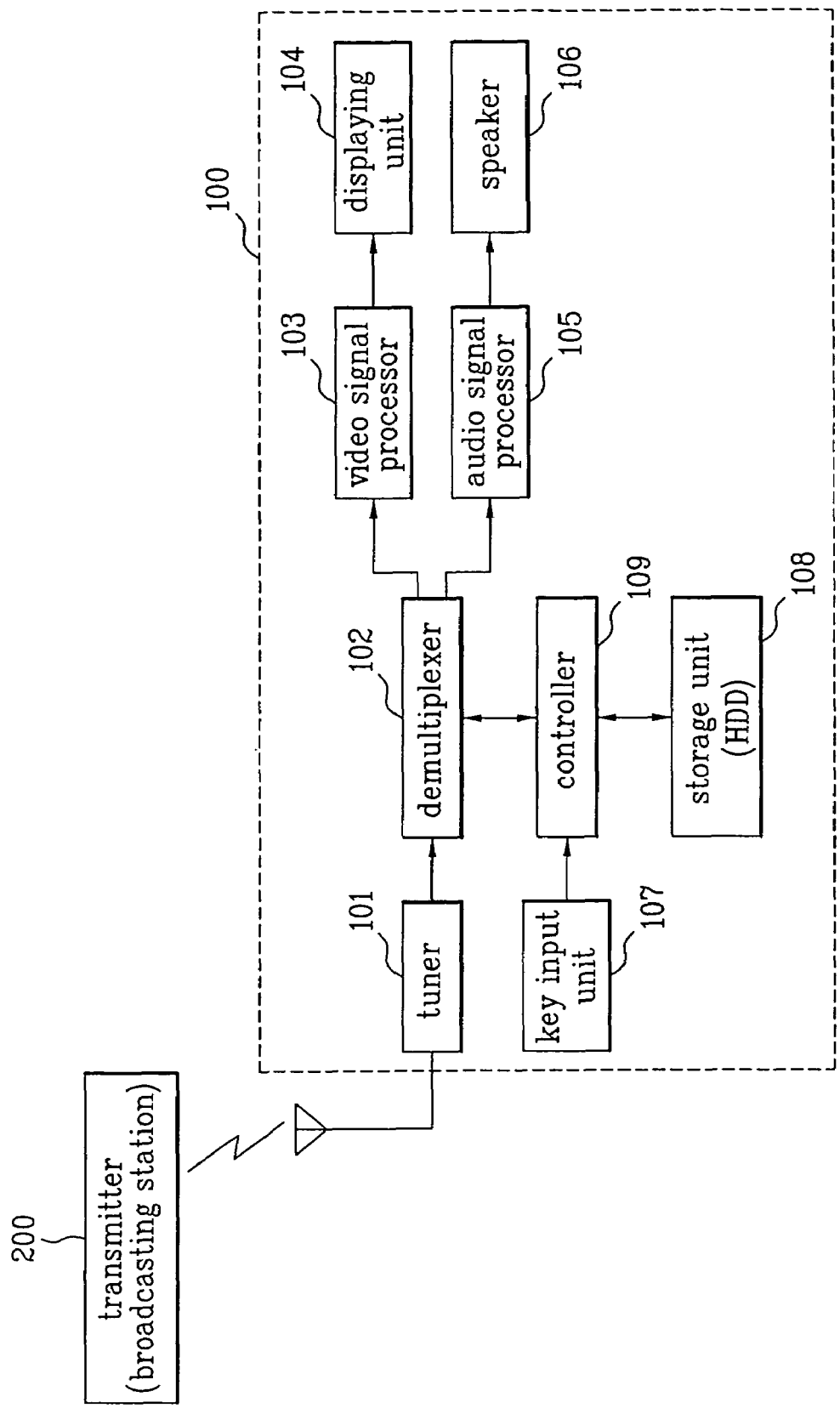
FIG. 1 is a block diagram of a display system in accordance with a preferred embodiment of the present invention.

FIG. 1 is a diagram illustrating a display system in accordance with a preferred embodiment of the present invention. Referring to FIG. 1, the display system includes a transmitter 200 and a display device 100. The transmitter 200 transmits a broadcasting signal through a sky wave, a cable or a satellite. The broadcasting signal transmitted from the transmitter 200 includes a video signal, an audio signal, and a data signal. The data signal includes supplementary information regarding a broadcasting program represented by the video and audio signals, and could also include additional information, such as an identification of the broadcasting station.

A manager, such as a producer of a broadcasting program or producer of a broadcasting station, can select key scenes of the broadcasting program or can select preview scenes or outline scenes so as to represent the plot of the broadcasting program. If partial scenes of the broadcasting program are selected by the manager, the transmitter 200 adds the information on the selected scenes to the supplementary information. The selected-scene information includes an indicator that indicates a video signal period or duration corresponding to the selected scenes, and/or a symbol or text is added to the supplementary information to indicate the beginning and/or end of the selected scenes.

As shown in FIG. 1, the display device 100 receives the broadcasting signal transmitted from the transmitter 200. The display device 100 includes: a tuner 101 for selecting a predetermined broadcasting signal among broadcasting signals received through an antenna; a demultiplexer 102 for separating the selected broadcasting signal into the video signal, the audio signal and the data signal (which includes the supplementary information); a video signal processor 103 for converting the video data of the video signal into a displayable signal and providing it to a displaying unit 104; an audio signal processor 105 for converting the audio data of the audio signal into an audible signal and providing it to a speaker 106; a key input unit 107 for receiving a command from a user; a controller 109 for allowing the supplementary information and the selected broadcasting program to be entirely or partially stored in a storage unit 108; and the storage unit 108, such as an HDD, for storing the supplementary information, the selected broadcasting program and the recording history.

A method for recording and replaying a broadcasting program in accordance with a first embodiment of the present invention will be described below.

FIRST EMBODIMENT

Figure 2:
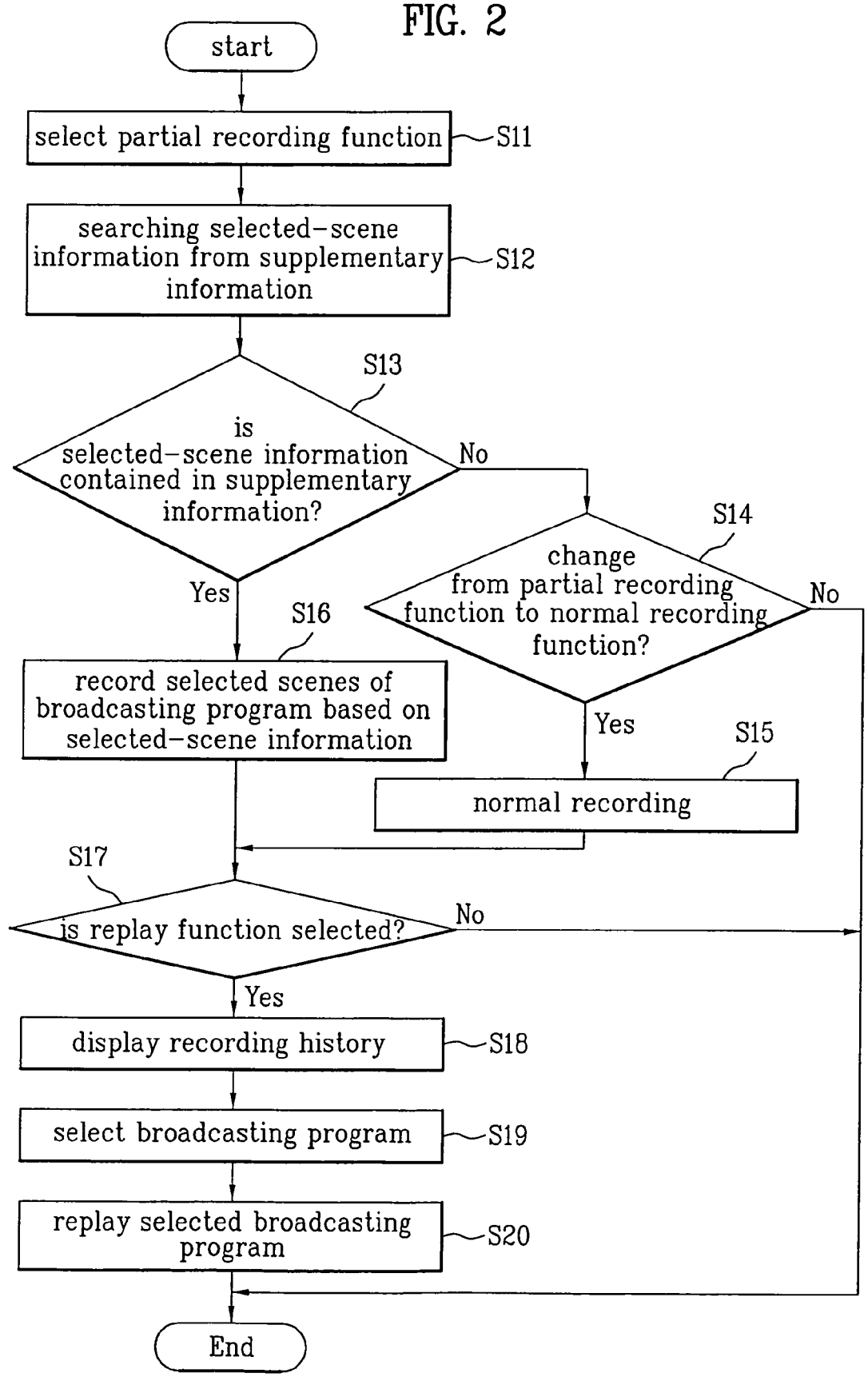
FIG. 2 is a flowchart illustrating a method for recording and replaying a broadcasting program in accordance with a first embodiment of the present invention.

FIG. 2 is a flowchart illustrating a method for recording and replaying a broadcasting program in accordance with a first embodiment of the present invention. The recording of the broadcasting program can be classified into a present recording and a preprogrammed recording. The present invention can be applied to both the present recording and the preprogrammed recording.

Referring to FIG. 2, a user can select a broadcasting program through an electronic program guide (EPG) displayed on a screen and can select a normal recording function or a partial recording function. The normal recording function will record all scenes of the broadcasting program, and the partial recording function will record select scenes of the broadcasting program, where the select scenes were pre-selected by the producer of the broadcasting program or the producer of the broadcasting station to represent a plot or preview of the broadcasting program.

If the user selects the partial recording function (S11), the controller 109 searches the selected-scene information from the supplementary information of the received broadcasting program (S12). If the selected-scene information is not contained in the supplementary information (S13), the controller 109 determines whether to change the partial recording function into the normal recording function (S14). The user can previously set an option of changing the partial recording function into the normal recording function when the selected-scene information is not contained in the supplementary information. Accordingly, the controller 109 can change the partial recording function into the normal recording function according to the set option. The option may be set via a setup menu displayed on the display device 100. After changing the partial recording function into the normal recording function, the controller 109 stores the entire scenes of the received broadcasting program in the storage unit 108 (S15).

If the selected-scene information is contained in the supplementary information (S13), the controller 109 detects the selected-scene information from the supplementary information and stores only select scenes of the broadcasting program into the storage unit 108 based on the detected selected-scene information (S16). For example, the controller 109 extracts only outline scenes from the received broadcasting program based on the detected selected-scene information and stores the extracted outline scenes in the storage unit 108. In other words, the controller 109 stores the detected selected-scene information in the storage unit 108 together with video and audio data corresponding to the outline scenes. Then, the controller 109 updates the recording history stored in the storage unit 108. That is, the controller 109 adds the information on the recorded broadcasting program, such as a title, a summary, a recording time and/or date, and a bit size or time duration of the recorded broadcasting program and information about whether the broadcasting program is recorded entirely or partially, to the recording history.

The user can view the recorded broadcasting program by the following method. If the user selects a replay function so as to view the recorded broadcasting program (S17), the controller 109 reads the recording history from the storage unit 108 and displays it on the screen of the displaying unit 104 (S18). An example of the recording history is shown in FIG. 3. The recording history shows the lists of the broadcasting programs whose scenes are entirely recorded and the broadcasting programs whose scenes are partially recorded. The user can select the broadcasting program from the displayed recording history so as to view the recorded broadcasting program (S19). For example, if the user selects a "Crimes In Time" broadcasting program recorded partially from the recording history, the controller 109 reads video and audio data corresponding to the partial scenes of the "Crimes In Time" broadcasting program from the storage unit 108. Then, the video signal processor 103 converts the video data into displayable video signals and displays the video signals on the screen of the displaying unit 104, and the audio signal processor 105 transmits the audio data to the speaker 106 (S20). Accordingly, the user can view only the partial scenes of the recorded broadcasting program.

In accordance with the first embodiment, storage space on the storage unit 108 is efficiently used, since the entire broadcasting program is not stored on the storage unit 108. Rather, only the characterizing scenes, as selected by the producer, are stored on the storage unit 108.

SECOND EMBODIMENT

Figure 4:
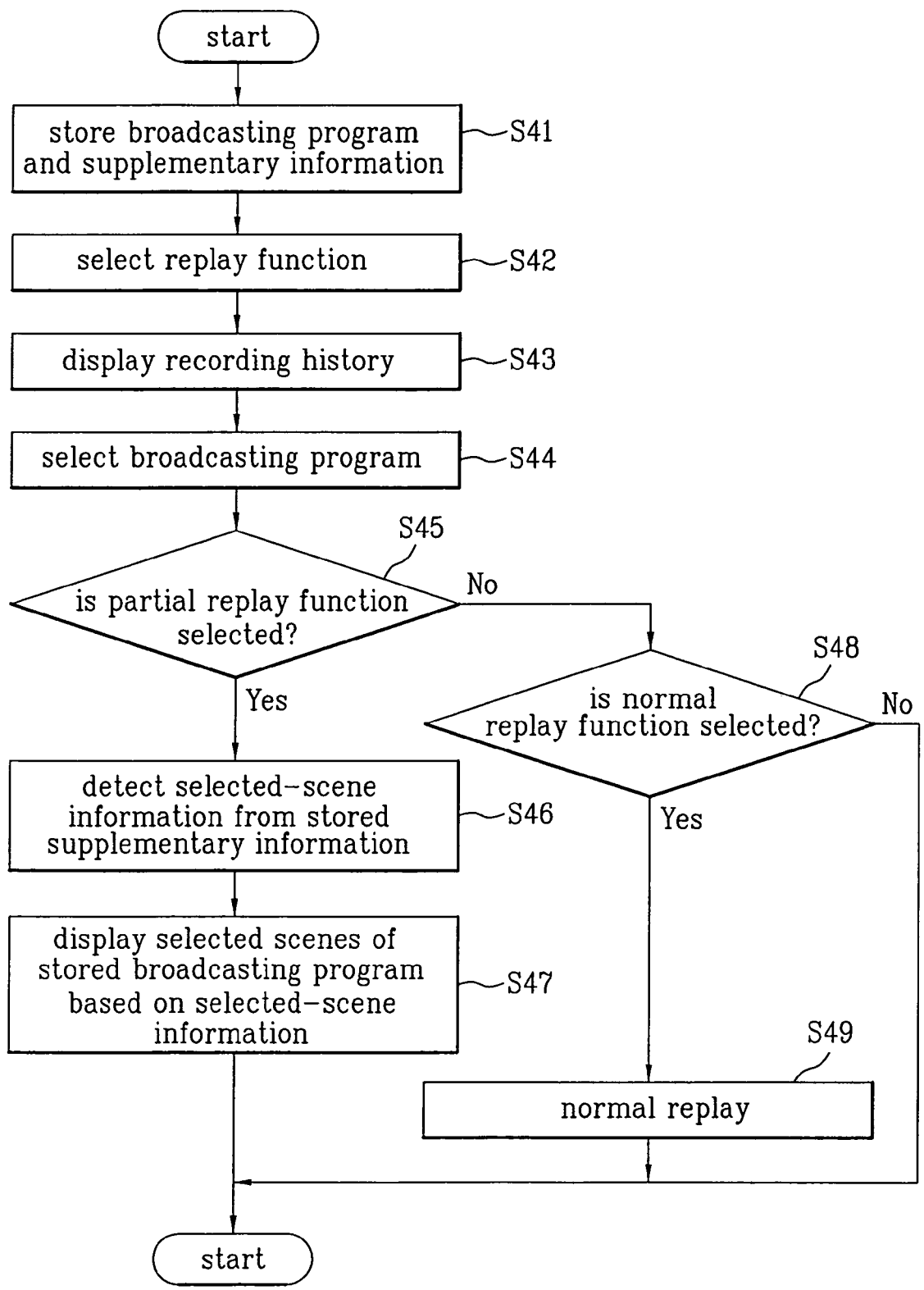
FIG. 4 is a flowchart illustrating a method for recording and replaying a broadcasting program in accordance with a second embodiment of the present invention.

FIG. 4 is a flowchart showing a method for recording and replaying a broadcasting program in accordance with a second preferred embodiment of the present invention. Referring to FIG. 4, if the user selects the recording function, the controller 109 determines whether or not the selected-scene information is contained in the supplementary information corresponding to the incoming broadcasting program, and stores the supplementary information and all scenes of the broadcasting program in the storage unit 108 (S41). Then, the controller 109 updates the recording history stored in the storage unit 108. In other words, the controller 109 adds the information on the stored broadcasting program, such as ID or title of the stored broadcasting program and information about whether the selected-scene information is contained in the supplementary information, to the recording history.

After the broadcasting program is recorded, if the user selects the replay function so as to view the recorded broadcasting program (S42), the controller 109 reads the recording history from the storage unit 108 and displays it on the screen of the displaying unit 104 (S43). An example of the recording history is shown in FIG. 5. The recording history includes titles of the stored broadcasting programs and represents whether or not the partial scenes of the broadcasting programs are available to be replayed. The user selects the broadcasting program from the displayed recording history (S44) and determines whether to replay the entire scenes or the partial scenes of the selected broadcasting program. For example, if the user selects a "Crimes in Time" broadcasting program and a "partial recording" option (S45), the controller 109 reads the selected-scene information corresponding to the selected broadcasting program from the storage unit 108 (S46). Then, the controller 109 reads the partial scenes of the selected broadcasting program from the storage unit 108 based on the selected-scene information. The video signal processor 103 converts video data of the partial scenes into displayable video signals and displays the video signals on the screen of the displaying unit 104 (S47), and the audio signal processor 105 transmits audio data of the partial scenes to the speaker 106. Accordingly, the user can view the partial scenes of the recorded broadcasting program. If the user selects the "normal recording" option (S48), the controller 109 reads the entire scenes of the broadcasting program from the storage unit 108 and displays them on the screen of the displaying unit 104 (S49).

In accordance with the first embodiment of the present invention, the partial scenes (for example, the key scenes or the outline scenes) of the broadcasting program can be selectively recorded. In accordance with the second embodiment, the partial scenes of an entirely recorded broadcasting program can be selectively replayed on the screen by using the selected-scene information.

THIRD EMBODIMENT

Figure 6:
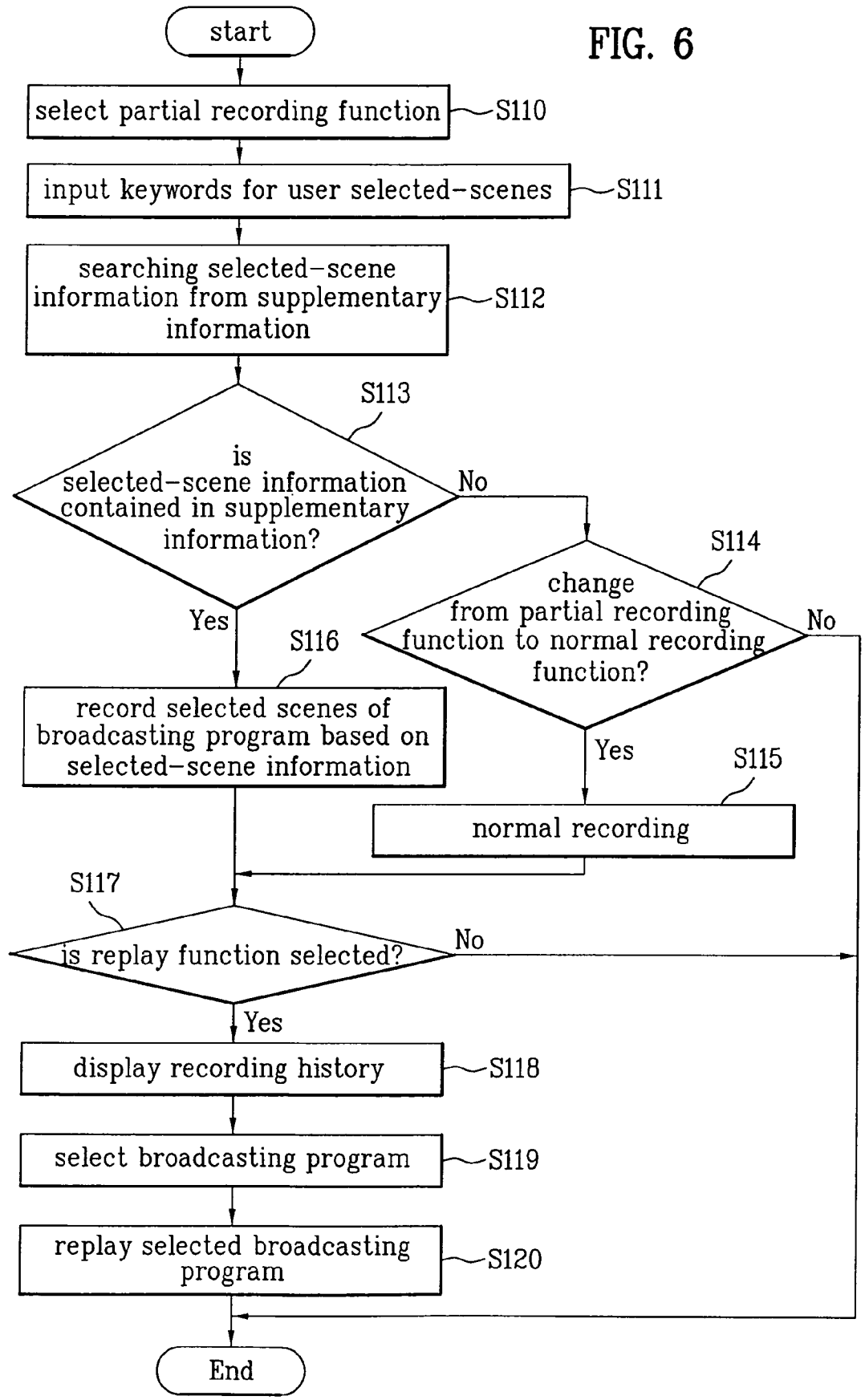
FIG. 6 is a flowchart illustrating a method for recording and replaying a broadcasting program in accordance with a third embodiment of the present invention.

FIG. 6 is a flowchart illustrating a method for recording and replaying a broadcasting program in accordance with a third embodiment of the present invention. Referring to FIG. 6, a user can select a broadcasting program through an electronic program guide (EPG) displayed on a screen and can select a normal recording function or a partial recording function. The normal recording function will record all scenes of the broadcasting program, and the partial recording function will record only select scenes of the broadcasting program, where the select scenes are user-selected by the user of the recording device. The user-selected scenes may be all scenes within the broadcasting program in which a particular actor or actress performs, particular action scenes, scenes with animals, beginning and/or ending credits, or any other type of scenes of particular interest to the user.

If the user selects the partial recording function (S110), the controller 109 causes an input menu to be displayed on the screen of the displaying unit 104. The input menu allows the user to input information identifying the user's selected scenes (S111). For example, the user can utilize a remote control keypad to input key words identifying the user's desired scenes in the broadcasting program, such as scenes in which a particular actor or actress performs, particular action scenes, beginning and/or ending credits, or any other type of scenes of particular interest to the user. For example, in a western movie, the user could input the key word "gunfight" and all scenes depicting a gunfight contained within the broadcasting program would be selected. As another example, the user could input "John Wayne," and all scenes in the broadcasting program depicting John Wayne would be selected.

As the broadcasting program is received by the recorder, the controller 109 searches the selected-scene information from the supplementary information of the received broadcasting program (S112). If the selected-scene information is not contained in the supplementary information (S113), the controller 109 determines whether to change the partial recording function into the normal recording function (S114). The user can previously set an option of changing the partial recording function into the normal recording function when the selected-scene information is not contained in the supplementary information. Accordingly, the controller 109 can change the partial recording function into the normal recording function according to the set option. The option may be set via a setup menu displayed on the display device 100, as discussed in conjunction with the first embodiment. After changing the partial recording function into the normal recording function, the controller 109 stores the entire scenes of the received broadcasting program in the storage unit 108 (S115).

If the selected-scene information is contained in the supplementary information (S113), the controller 109 detects the selected-scene information from the supplementary information and stores only the select scenes of the broadcasting program into the storage unit 108 based on the detected selected-scene information (S116). Therefore, the supplementary information, transmitted along with the broadcasting program, will include numerous key word identifiers to indicate a beginning of, a period of, and/or an end of various types of scenes. For example, first symbols or text are included in the supplementary information to indicate the presence of gunfight scenes, second symbols or text are included in the supplementary information to indicate scenes in which John Wayne performs, third symbols or text indicate the ending credits, etc.

The symbols or text, indicating types of scenes, are inputted into the supplementary information by the producer of the broadcasting program or the producer of the broadcasting station. In order for the user's inputted keywords, to match the producer's keywords in the supplementary information, it would be possible to have the same scenes identified by numerous similar phrases or key words. For example, the keywords "gunfight," "shootout" and "showdown" could all be included in the supplementary information to indicate the same gunfight scenes in the broadcasting program.

Alternatively, there could be a published list of possible keywords for a user to select from. The list could be accessible via an Internet web site. The list could also be specific to movie titles. Therefore, a user could access a list of possible key words for a certain movie to learn the various possibilities for creating a list of user-selected scenes to record from that movie title on their PVR.

Once the user has selected one or more key words or phrases via the input menu, the controller 109 evaluates the supplementary information as the broadcasting program is received and extracts only the user-scenes from the received broadcasting program and stores the extracted user-selected scenes in the storage unit 108. Then, the controller 109 updates the recording history stored in the storage unit 108. That is, the controller 109 adds the information on the recorded broadcasting program, such as a title, a summary, a recording time and/or date, and a bit size or time duration of the recorded broadcasting program and information about whether the broadcasting program is recorded entirely or partially, to the recording history.

The user can view the recorded broadcasting program by the following method. If the user selects a replay function so as to view the recorded broadcasting program (S117), the controller 109 reads the recording history from the storage unit 108 and displays it on the screen of the displaying unit 104 (S118). An example of the recording history is shown in FIG. 3. The recording history shows the lists of the broadcasting programs whose scenes are entirely recorded and the broadcasting programs whose scenes are partially recorded. The user can select the broadcasting program from the displayed recording history so as to view the recorded broadcasting program (S119). Then, the video signal processor 103 converts the video data into displayable video signals and displays the video signals on the screen of the displaying unit 104, and the audio signal processor 105 transmits the audio data to the speaker 106 (S120). Accordingly, the user can view only the selected scenes of the recorded broadcasting program.

In accordance with the third embodiment, storage space on the storage unit 108 is efficiently used, since the entire broadcasting program is not stored on the storage unit 108. Rather, only the desired scenes, as selected by the user, are stored on the storage unit 108.

The second embodiment may also be modified to form a fourth embodiment, replacing producer-selected scenes with user-selected scenes. In other words, the entire broadcasting program would be stored on the storage unit 108 along with the supplementary information. If the supplementary information includes scene-specific identifications, such as symbols or text, the user could select to play the entire broadcasting program or play only certain user-selected scenes within the broadcasting program.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for selectively recording a pre-selected subset of scenes of a broadcasting program, the pre-selected subset of scenes being pre-selected prior to broadcasting the broadcasting program, the method comprising the steps of:
   receiving the broadcasting program and corresponding supplementary information;
   determining whether or not information on the pre-selected subset of scenes of the broadcasting program is contained in the supplementary information; and
   if the determining step determines the information on the pre-selected subset of scenes is contained in the supplementary information,
       extracting the information on the pre-selected subset of scenes from the supplementary information,
       recording the pre-selected subset of scenes of the broadcasting program based on the extracted information, and
       updating a recording history stored in the storage unit, the recording history including a recording status indicating a ratio of a partial recording of the broadcasting program.

2. The method of claim 1, wherein the extracted information on the pre-selected subset of scenes includes an indicator that indicates a video signal period corresponding to the pre-selected subset of scenes.

3. The method of claim 1, wherein the information on the pre-selected subset of scenes includes a symbol or text, which represents the pre-selected subset of scenes.

4. The method of claim 1, further comprising the step of:
   if the determining step determines that the information on the pre-selected subset of scenes is not contained in the supplementary information, recording an entirety of the broadcasting program.

5. The method of claim 1, wherein the recording history includes at least one of a title, a summary, a recording time or date, or a bit size or time duration of the recorded pre-selected subset of scenes of broadcasting program or a ratio of a viewing duration of the pre-selected subset of scenes to a viewing duration of an entirety of the broadcasting program.

6. A method for selectively playing a pre-selected subset of scenes of a broadcasting program recorded in a recording device, the pre-selected subset of scenes being pre-selected prior to broadcasting the broadcasting program, the method comprising the steps of:
- displaying on a screen a recording history of the recording device, the recording history including a list of recorded broadcasting programs, the list including recording status indicating a ratio of a partial recording of the broadcasting programs;
- selecting the broadcasting program from the list of recorded broadcasting programs in response to a user input;
- determining whether to replay an entirety of the broadcasting program or a pre-selected subset of scenes of the broadcast program according to the recording history;
- extracting information on a pre-selected subset of scenes of the broadcast program and corresponding supplementary information stored in a storage unit; and
- selectively playing the pre-selected subset of scenes based on the extracted information on the pre-selected scenes.

7. The method of claim 6, wherein the step of detecting includes the step of checking for information indicating that the information on the pre-selected subset of scenes is contained in the supplementary information.

8. The method of claim 6, wherein the information on the pre-selected subset of scenes includes an indicator that indicates a video signal period corresponding to the pre-selected subset of scenes.

9. The method of claim 6, wherein the information on the pre-selected subset of scenes includes a symbol or a text, which represents the pre-selected subset of scenes.

10. A device configured to selectively record a pre-selected subset of scenes of a broadcasting program, the pre-selected subset of scenes being pre-selected prior to broadcasting the broadcasting program, comprising:
- a tuner configured to receive the broadcasting program and corresponding supplementary information;
- a controller configured to
  - determine whether or not information on the pre-selected subset of scenes of the broadcasting program is contained in the supplementary information, and
  - if the information on the pre-selected subset of scenes is determined to be contained in the supplementary information,
    - extract the information on the pre-selected subset of scenes from the supplementary information, and
    - record the pre-selected subset of scenes of the broadcasting program based on the extracted information;
- a storage unit configured to store the pre-selected subset of scenes of the broadcasting program based on the extracted information and a recording history, the recording history including a recording status indicating a ratio of a partial recording of the broadcasting program; and
- a display unit configured to selectively display the pre-selected subset of scenes of the stored broadcasting program based on the extracted information.

11. The device of claim 10, wherein the information on the pre-selected subset of scenes includes an indicator that indicates a video signal period corresponding to the pre-selected subset of scenes.

12. The device of claim 10, wherein the information on the pre-selected subset of scenes includes a symbol or text, which represents the pre-selected subset of scenes.

13. The device of claim 10, wherein the controller is configured to add information indicating that the extracted information on the pre-selected subset of scenes is contained in the supplementary information to the recording history.

14. The device of claim 10, wherein the recording history includes at least one of a title, a summary, a recording time or date or a bit size or time duration of the recorded broadcasting program or a ratio of a viewing duration of the pre-selected subset of scenes to a viewing duration of the entirety of the broadcasting program.

15. A device configured to selectively play a user-selected subset of scenes of a broadcasting program recorded in a recording device, comprising:
- a tuner configured to receive the broadcasting program and corresponding supplementary information;
- a remote control keypad configured to input a key word identifying a user-selected parameter for selecting a subset of scenes in the broadcasting program;
- a controller configured to detect user-selected scenes from the broadcasting program corresponding to the user-selected parameter; and
- a storage unit configured to store the user-selected scenes corresponding to the user-selected parameter and to store a recording history, the recording history including a recording status indicating a ratio of a partial recording of the broadcasting program.

16. The device of claim 15, wherein the recording history includes information indicating that the broadcasting program has been recorded with the user-selected scenes.

17. The device of claim 15, wherein the recording history includes at least one of a title, a summary, a recording time or date or a bit size or time duration of the broadcasting program or a ratio of a viewing duration of the user-selected scenes to a viewing duration of the entirety of the broadcasting program.

18. A system configured to transmit, receive and selectively record a pre-selected subset of scenes of a broadcasting program, the pre-selected subset of scenes being pre-selected prior to broadcasting the broadcasting program, comprising:
- a transmitter configured to transmit the broadcasting program and corresponding supplementary information; and
- a receiving device configured to
  - receive the broadcasting program and the corresponding supplementary information;
  - determine whether or not information on the pre-selected subset of scenes of the broadcasting program is contained in the supplementary information, and
  - if the information on the pre-selected subset of scenes is determined to be contained in the supplementary information,
    - extract the information on the pre-selected subset of scenes from the supplementary information,
    - record the pre-selected subset of scenes of the broadcasting program based on the extracted information, and
    - update a recording history stored in the storage unit, the recording history including a recording status indicating a ratio of a partial recording of the broadcasting program.

19. The system of claim 18, wherein the pre-selected subset of scenes are preview scenes or outline scenes that represent a plot of the broadcasting program, as selected by a producer of the broadcasting program or a producer of a station transmitting the broadcasting program.

20. The system of claim 18, wherein the receiving device is configured to enable a user to select and record one or more of the pre-selected subset of scenes.

21. The system of claim 20, wherein the receiving device is configured to enable the user to input keywords to identify the one or more of the pre-selected subset of scenes within the broadcasting program.

22. A method for selectively playing a user-selected subset of scenes of a broadcasting program recorded in a recording device, the method comprising the steps of:

receiving the broadcasting program and corresponding supplementary information;

inputting a key word identifying a user-selected parameter for selecting a subset of scenes in the broadcasting program;

detecting user-selected scenes from the broadcasting program corresponding to the user-selected parameter; and storing the user-selected scenes corresponding to the user-selected parameter and a recording history, the recording history including a recording status indicating a ratio of a partial recording of the broadcasting program.

23. The method of claim 22, wherein the recording history includes at least one of a title, a summary, a recording time or date, a bit size or time duration of the recorded user-selected scenes, or a ratio of a viewing duration of the user-selected scenes to a viewing duration of the entirety of the broadcasting program.

* * * * *